United States Patent [19]

Picard

[11] 3,955,053

[45] May 4, 1976

[54] INTEGRATED CIRCUIT ARRANGEMENT FOR A TELEPHONE SUBSCRIBER STATION

[75] Inventor: Peter Picard, Munich, Germany

[73] Assignee: Siemens Aktiengesellschaft, Berlin and Munich, Germany

[22] Filed: Aug. 8, 1974

[21] Appl. No.: 495,801

Related U.S. Application Data

[63] Continuation of Ser. No. 293,451, Sept. 29, 1972, abandoned.

[30] Foreign Application Priority Data

Sept. 30, 1971 Germany............................ 2148929

[52] U.S. Cl. .................. 179/81 A; 179/170 NC
[51] Int. Cl.² ......................................... H04M 1/58
[58] Field of Search ......... 179/81 A, 81 B, 170 NC, 179/16 F, 81 R; 323/22 T, 8, 9

[56] References Cited
UNITED STATES PATENTS

| | | | |
|---|---|---|---|
| 3,440,367 | 4/1969 | Holtz | 179/170 NC |
| 3,462,560 | 8/1969 | Holzman | 179/170 NC |
| 3,529,099 | 9/1970 | Ribner | 179/81 A |
| 3,530,260 | 9/1970 | Gaunt | 179/170 NC |
| 3,612,781 | 10/1971 | DaCosta | 179/170 NC |

Primary Examiner—Kathleen H. Claffy
Assistant Examiner—Joseph Popek

[57] ABSTRACT

An integrated circuit construction for a telephone subscriber station having a microphone amplifier and a receiving audio amplifier is described. An impedance bridge replaces the conventionally used hybrid transformer. The aforementioned amplifiers are constructed in integrated circuit form as differential amplifiers, which are excited in parallel by separate reference voltages produced from two constant currents generated in a common source.

1 Claim, 2 Drawing Figures

INTEGRATED CIRCUIT ARRANGEMENT FOR A TELEPHONE SUBSCRIBER STATION

This is a continuation of application Ser. No. 293,451, filed Sept. 29, 1972, now abandoned.

BACKGROUND OF THE INVENTION

This invention relates to a monolithic integrated circuit for a telephone circuit for centrally fed subscriber stations having a microphone amplifier and a receiving amplifier, wherein the conventionally used hybrid transformer is replaced by a resistance bridge and wherein the receiving and microphone amplifiers are constructed as monolithic integrated differential amplifiers.

Monolithic integrated circuit arrangements are known in the art. Further, integrated circuit subscriber station constructions are known which have the hybrid transformer replaced by a resistance bridge and wherein in one diagonal of the bridge a receiver is provided having an audio amplifier and in another diagonal of the bridge a microphone is provided but without an amplifier. Reference is made to the German Pat. Publication No. 1,762,058. Thus, in these prior art circuit arrangements there is no provision at the transmitting end for amplifying the message or voice signal.

Other conventional circuit arrangements are of discrete or hybrid design, having a resistance bridge instead of the hybrid transformer and wherein an audio amplifier is disposed in one bridge diagonal and a microphone amplifier is disposed in the other bridge diagonal. Reference is made to French Pat. No. 1,521,690, wherein, however, the decoupling of the amplifiers is achieved by means of component parts which cannot be used for an integrated circuit arrangement.

This invention has as an object the provision of a monolithic integrated circuit arrangement for a telephone circuit which can be connected to each subscriber line, while maintaining decoupling of the microphone and receiving amplifiers.

SUMMARY OF THE INVENTION

This is accomplished by using two differential amplifiers. The amplifiers are each excited by a reference voltage, the two reference voltages being independent of each other and obtainable from two independent constant currents from a common source.

By using the foregoing arrangement, it is possible to decouple simply and completely from each other the audio amplifier and the microphone amplifier by using a bridge circuit, instead of a hybrid transformer, through reference voltages obtained from constant currents which are independent from each other. Since the two differential amplifiers, as well as the constant current source, can be constructed conventionally using integrated circuit techniques. The advantages resulting from the properties of integrated circuits, such as light weight, reduced bulk and low supply and input signal voltages will also be obtained for the inventive circuit arrangement discussed hereinabove.

BRIEF DESCRIPTION OF THE DRAWINGS

The principles of this invention will be most readily understood by reference to the description, given below, of a preferred embodiment constructed according to those principles and to the accompanying drawings, wherein.

DETAILED DESCRIPTION OF THE DRAWINGS

Figure 1:
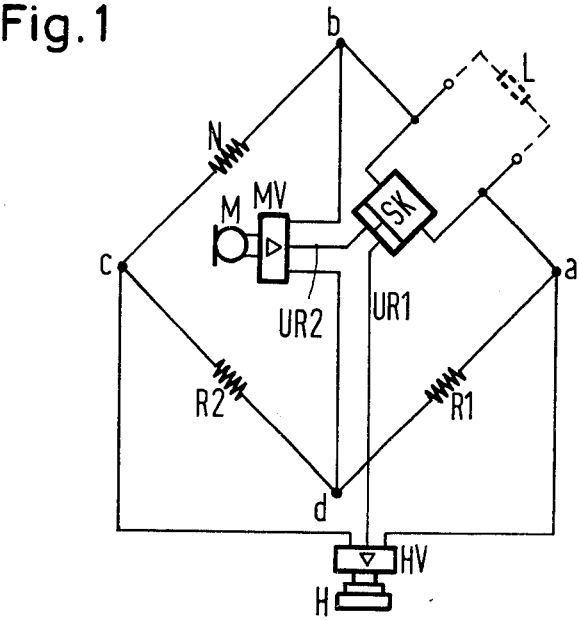
FIG. 1 is a schematic-block diagram of an equivalent circuit of the aforementioned preferred embodiment and FIG. 2 is a detailed schematic diagram of the preferred embodiment.

FIG. 1 shows, for descriptive purposes, an equivalent circuit resistance bridge in accordance with the invention comprising bridge balancing resistances R1 and R2, the balancing network N, the line resistance L, microphone M, microphone amplifier MV, the receiver H with the audio amplifier HV, constant current source SK with the two outputs UR1 and UR2. The junction points of the bridge resistance are labeled $a$, $b$, $c$, and $d$. From this diagram is also apparent the conventional approach applicable to this circuit arrangement for producing a satisfactory side-tone reference equivalent. Due to the bridge balancing, no potential difference can exist between the points $a$ and $c$, because of the signal voltage produced by the microphone amplifier MV. Thus, the input of the audio amplifier HV is not excited by a signal voltage either. The constant current source SK is of very high impedance (alternating current), so that it becomes meaningless with respect to the bridge balancing.

Figure 2:
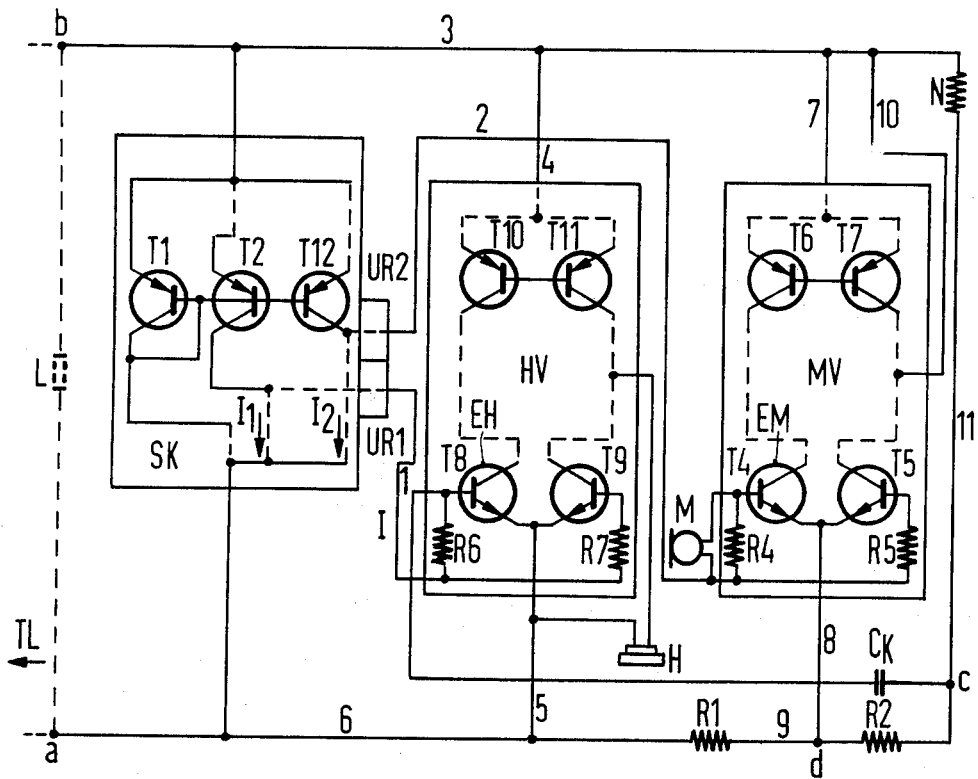

FIG. 2 illustrates a preferred embodiment showing only the details necessary for understanding the invention. The reference letters and numerals in FIG. 2 correspond to those in FIG. 1.

The circuit arrangement having inputs $a$ and $b$ (TL) comprises a, a constant current source SK, an audio amplifier HV with receiver H, a microphone amplifier MV with microphone M, balancing network N, a coupling capacitor CK and bridge resistances R1 and R2.

The constant current source SK disposed between the output terminals $a$ and $b$, is constructed in the known manner, such that it supplies two constant currents, which are independent from each other. The construction of this constant current source is shown in FIG. 2, wherein the transistor T1 is a control transistor and the transistors T2 and T3 are power supply transistors. With the aid of the latter, independent constant currents I1 and I2, and reference voltages UR1 and UR2, which are likewise independent of each other, are obtained in the known manner by means of transistors, which are connected as diodes. With each of these reference voltages the inputs of the audio amplifier HV, constructed as a differential amplifier (UR1 via line 1), and of the microphone amplifier MV, likewise constructed as a differential amplifier (UR2 via line 2), are excited. Thus, complete decoupling of the two amplifiers is assured. The supply of the amplifiers with line voltage takes place in the known manner via the output terminals $a$ and $b$ of the circuit over lines 3, 4, 5 and 6 or 3, 7, 8, 9 and 6.

The coupling of the signal voltage generated by the microphone M to the microphone amplifier MV takes place by being superimposed on reference voltage UR2 at input (EM) of the microphone amplifier MV, constructed as a differential amplifier. This construction is shown in FIG. 2, wherein the transistors T4 and T5 are the transistors of the differential amplifier, the transistors T6 and T7 are active load impedances and the resistances R4 and R5 are series resistances.

The amplified signal voltage is applied to subscriber output terminal d towards the subscriber line via the lines 10 and 3. The signal voltage received over the bscriber line TL is coupled to audio amplifier HV er the lines 3, 11 and 12. This alternating voltage is, ewise, superimposed on the reference voltage UR1 d applied to an input EH of audio amplifier HV, ich is also constructed as a differential amplifier. e amplified signal voltage obtained from the audio plifier HV is routed to the receiver H.

The construction of the amplifier HV is illustrated in G. 2, wherein the transistors T8 and T9 form a differtial amplifier, the transistors T10 and T11 are active d impedances, and the resistances R6 and R7 are ries resistances. The line voltage supply for the audio plifier HV in the conventional manner proceeds m output terminal b to output terminal a via lines 3, 5 and 6. The capacitor Ck disposed between the iction point c and the audio amplifier HV serves to late the d.c. supply voltage.

The resistances N, R1 and R2 are used to balance the dge (as shown in FIG. 1).

The invention has been described herein in terms of exemplary embodiment to which modifications or anges can be made within the scope of the appended claims. Thus, the above description should not be considered to be limiting.

I claim:

1. In a circuit arrangement for a telephone subscriber station having a microphone amplifier and a receiving amplifier, said amplifiers being connected in different diagonals of an impedance bridge circuit, the improvement comprising:

two differential amplifiers constructed in integrated circuit form, one of said differential amplifiers being said microphone amplifier and the other differential amplifier being said receiving amplifier, constant current source means for producing two independent constant currents and including means for deriving independent reference voltages from said constant currents and means for connecting one of said reference voltages to said one differential amplifier and for connecting the other of said reference voltages to said other differential amplifier.

* * * * *